(12) United States Patent
Junca

(10) Patent No.: US 10,975,555 B1
(45) Date of Patent: Apr. 13, 2021

(54) CLEANOUT PORT DRAIN ASSEMBLY AND METHOD

(71) Applicant: Charles H. Junca, Sunset, LA (US)

(72) Inventor: Charles H. Junca, Sunset, LA (US)

(*) Notice: Subject to any disclaimer, the term of this patent is extended or adjusted under 35 U.S.C. 154(b) by 0 days.

(21) Appl. No.: 16/748,261

(22) Filed: Jan. 21, 2020

Related U.S. Application Data

(62) Division of application No. 15/899,493, filed on Feb. 20, 2018, now abandoned.

(60) Provisional application No. 62/600,467, filed on Feb. 23, 2017.

(51) Int. Cl.
| | |
|---|---|
| *E03C 1/304* | (2006.01) |
| *E03C 1/262* | (2006.01) |
| *E03C 1/284* | (2006.01) |
| *F16K 43/00* | (2006.01) |

(52) U.S. Cl.
CPC ............. *E03C 1/304* (2013.01); *E03C 1/262* (2013.01); *E03C 1/284* (2013.01); *F16K 43/00* (2013.01)

(58) Field of Classification Search
CPC .......... E03C 1/304; E03C 1/262; E03C 1/284; E03C 1/282; F16K 43/00
USPC .............................. 4/255.01, 255.04, 255.07
See application file for complete search history.

(56) References Cited

U.S. PATENT DOCUMENTS

| 8,418,274 B2 | 4/2013 | Dodson | |
|---|---|---|---|
| 2015/0225933 A1* | 8/2015 | Makaton | E03C 1/284 |
| | | | 137/123 |
| 2015/0275490 A1 | 10/2015 | Letcher | |
| 2016/0305103 A1 | 10/2016 | Corbin | |

OTHER PUBLICATIONS

Applicant's co-pending U.S. Appl. No. 15/899,493, filed Feb. 20, 2018.

* cited by examiner

*Primary Examiner* — Tuan N Nguyen
(74) *Attorney, Agent, or Firm* — Jones Walker LLP

(57) ABSTRACT

A cleanout port drain assembly providing a P-trap for a drain system. The cleanout port drain assembly having an upwardly extending, front facing cleanout port section with a detachable end cap. Removal of the end cap exposes an opening into the cleanout port section. A nozzle of a suction device or a snake may be inserted through the opening and into the cleanout port section to cause a clog to be dislodged and pulled from the drain system out through the opening in the cleanout port section to enable the drain system to drain.

23 Claims, 6 Drawing Sheets

CLEANOUT PORT DRAIN ASSEMBLY AND METHOD

CROSS-REFERENCE TO RELATED APPLICATIONS

This application is a divisional of and claims priority to U.S. patent application Ser. No. 15/899,493, filed on 20 Feb. 2018, which claims priority to U.S. Provisional Patent Application No. 62/600,467, filed on 23 Feb. 2017, which are each incorporated by reference herein.

BACKGROUND OF THE DISCLOSURE

The disclosure relates to cleanout port drain assemblies and methods of using same, including front-facing cleanout ports associated with drainage traps.

SUMMARY OF THE INVENTION

The disclosure relates to an embodiment of the cleanout port drain assembly that may include a central inlet section having an upper end section and a lower end section. The upper end section may be configured for connection to a drain line. The assembly may also include a C-shaped outlet section having an upper end section and a lower end section. The upper end section may be configured for connection to an outlet line. The lower end section may terminate at the lower end section of the central inlet section. The central inlet section and the C-shaped outlet section may be in fluid communication with each other. The assembly may also include a cleanout port section having an upper end section and a lower end section. The upper end section may include a detachable end cap. The lower end section may terminate at the lower end section of the central inlet section. The cleanout port section may extend upwardly at an angle away from the central inlet section. The cleanout port section may be in fluid communication with the central inlet section and the C-shaped outlet section.

In another embodiment, the angle of the cleanout port section may be in the range of 40° to 60°. The angle of the cleanout port section may also be about 50°.

In another embodiment, the end cap may be threadedly connected to the upper end section of the cleanout port section.

In another embodiment, the end cap may contain internal threads and the upper end section of the cleanout port section may contain external threads.

In another embodiment, the upper end section of the cleanout port section may include an inner wall dimensioned to accommodate a nozzle of a suction device.

In another embodiment, the inner wall may contain a taper configured to accommodate the nozzle of the suction device.

In another embodiment, the upper end section of the cleanout port section may contain external threads configured for mating engagement with a connecting collar containing internal threads. The connecting collar may be associated with a nozzle of a suction device for detachable connection of the nozzle to the upper end section of the cleanout port section.

In another embodiment, the cleanout port section may include a valve positioned within an internal bore extending from the upper end section to the lower end section of the cleanout port section.

In another embodiment, the valve may be a mechanical valve.

An alternative embodiment of the cleanout port drain assembly may include a central inlet section having an upper end section and a lower end section. The upper end section may be configured for connection to a drain line. The central inlet section may have a front side and a back side. The assembly may include a C-shaped outlet section having an upper end section and a lower end section. The upper end section may be configured for connection to an outlet line. The lower end section may terminate at the lower end section of the central inlet section. The C-shaped outlet section may be positioned on the back side of the central inlet section. The central inlet section and the C-shaped outlet section may be in fluid communication with each other. The assembly may also include a cleanout port section having an upper end section and a lower end section. The upper end section may include a detachable end cap. The lower end section may terminate at the lower end section of the central inlet section. The cleanout port section may be positioned on the front side of the central inlet section and may extend upwardly at an angle away from the central inlet section. The cleanout port section may be in fluid communication with the central inlet section and the C-shaped outlet section.

In another alternative embodiment, the angle of the cleanout port section may be in the range of 40° to 60°. The angle of the cleanout port section may be about 50°.

In another alternative embodiment, the end cap may be threadedly connected to the upper end section of the cleanout port section.

In another alternative embodiment, the end cap may contain internal threads and the upper end section of the cleanout port section may contain external threads.

In another alternative embodiment, the upper end section of the cleanout port section may include an inner wall dimensioned to accommodate a nozzle of a suction device.

In another alternative embodiment, the inner wall may contain a taper configured to accommodate the nozzle of the suction device.

In another alternative embodiment, the upper end section of the cleanout port section may contain external threads configured for mating engagement with a connecting collar containing internal threads. The connecting collar may be associated with a nozzle of a suction device for detachable connection of the nozzle to the upper end section of the cleanout port section.

In another alternative embodiment, the cleanout port section may include a valve positioned within an internal bore extending from the upper end section to the lower end section of the cleanout port section.

In another alternative embodiment, the valve is a mechanical valve.

The disclosure also relates to an embodiment of a method of removing a clog from a drain pipe system that may comprise the step (a) gaining access to a cleanout port drain assembly comprising: a central inlet section having an upper end section and a lower end section, the upper end section operatively connected to a drain line; a C-shaped outlet section having an upper end section and a lower end section, the upper end section operatively connected an outlet line, the lower end section terminating at the lower end section of the central inlet section, the central inlet section and the C-shaped outlet section being in fluid communication with each other; a cleanout port section having an upper end section and a lower end section, the upper end section including a detachable end cap, the lower end section terminating at the lower end section of the central inlet section, the cleanout port section extending upwardly at an angle away from the central inlet section, the cleanout port section being in fluid communication with the central inlet section and the C-shaped outlet section. The method may include the step (b) removing the detachable end cap from the upper end section of the cleanout port section to expose an opening in the upper end section. The method may include the step (c) inserting a nozzle from a suction device through the opening and into the upper end section of the cleanout port section to establish an airtight seal between the nozzle and the cleanout port section. The method may include the step (d) activating the suction device to create a suction force whereby the suction force causes the clog to dislodge from the drain pipe system and to be pulled by the suction force into the cleanout port section, through the opening, and through the nozzle to a container operatively associated with the suction device for capture and disposal of the clog. The method may include the step (e) removing the nozzle from the upper end section of the cleanout port section. The method may include the step (f) securing the end cap to the upper end section of the cleanout port section.

In another embodiment, the suction device may be a portable shop vac or wet vac.

In another embodiment, the suction device may be contained on a motor vehicle or trailer transported by a motor vehicle.

In another embodiment, the nozzle may include a connecting collar and wherein in step (c) the connecting collar may be operatively connected to the upper end section of the cleanout port section and in step (e) the connecting collar may be operatively disconnected from the upper end section of the cleanout port section.

In an alternative embodiment, the method of removing a clog from a drain pipe system may comprise the step (a) gaining access to a cleanout port drain assembly comprising: a central inlet section having an upper end section and a lower end section, the upper end section operatively connected to a drain line; a C-shaped outlet section having an upper end section and a lower end section, the upper end section operatively connected an outlet line, the lower end section terminating at the lower end section of the central inlet section, the central inlet section and the C-shaped outlet section being in fluid communication with each other; a cleanout port section having an upper end section and a lower end section, the upper end section including a detachable end cap, the lower end section terminating at the lower end section of the central inlet section, the cleanout port section extending upwardly at an angle away from the central inlet section, the cleanout port section being in fluid communication with the central inlet section and the C-shaped outlet section. The method may include the step (b) removing the detachable end cap from the upper end section of the cleanout port section to expose an opening in the upper end section. The method may include the step (c) inserting a snake through the opening in the upper end section of the cleanout port section. The method may include the step (d) causing the snake to extend into the drain pipe system and make binding contact with the clog and thereby dislodge the clog. The method may include the step (e) retrieving the snake and thereby pulling the clog into the cleanout port section and out through the opening. The method may include the step (e) securing the end cap to the upper end section of the cleanout port section.

DETAILED DESCRIPTION OF THE DISCLOSURE

Figure 1:
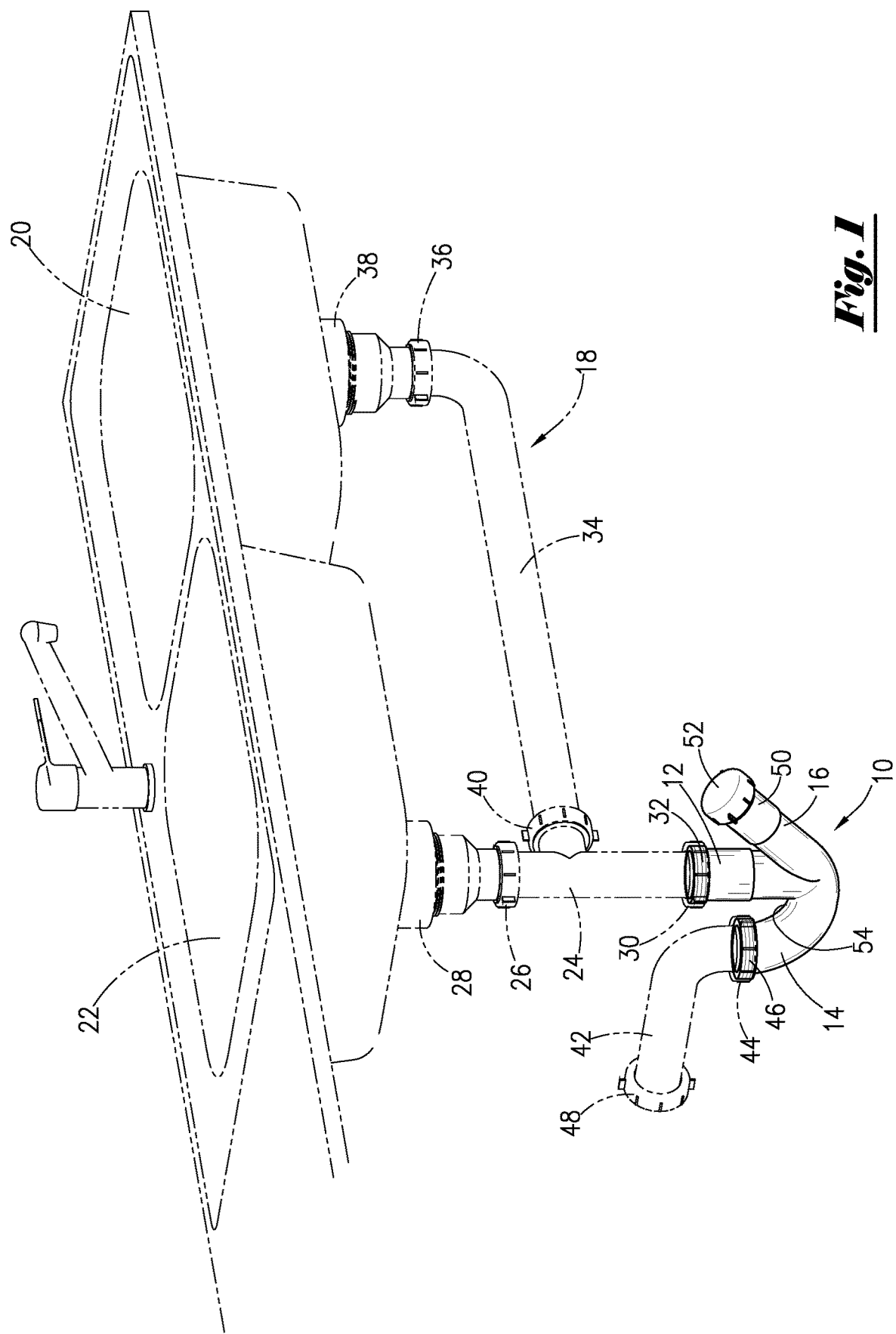
FIG. 1 is a perspective view of a first embodiment of the cleanout port drain assembly associated with a drain trap.

With reference to the figures where like elements have been given like numerical designations to facilitate an understanding of the present disclosure, and particularly with reference to the embodiment of the cleanout port drain assembly illustrated in the FIG. 1, cleanout port drain assembly 10 may include a central inlet section 12, a backward facing outlet section 14, and a front facing cleanout port section 16. Cleanout port drain assembly 10 is shown operatively connected to and in fluid communication with drain system 18 that is operatively connected to and in fluid communication with sinks 20, 22. While FIG. 1, shows cleanout port drain assembly 10 as being operatively connected to drain system 18 associated with sinks 20, 21, it is to be understood that cleanout port drain assembly 10 could be operatively connected to and in fluid communication with any type of drain system 18 such as the drainage system for a kitchen sink, bathroom sink, mop sink, or any other drainage system in which a P-trap or other similar trap (e.g., S-trap, J-trap etc.) is used. Furthermore, while FIG. 1 shows drainage system 18 operatively connected to two sinks 20, 22, it is to be understood that cleanout port drain assembly 10 may be operatively connected to a drainage system 18 that functions to drain a single sink, three or more sinks, or any number of sinks or similar drainage devices.

With further reference to FIG. 1, drainage system 18 may include drainage line 24. Drainage line 24 may include first end section 26 operatively connected to drain section 28 of sink 22 and a second end section 30 operatively connected to upper end section 32 of central inlet section 12. Drainage system 18 may also include drainage line 34 with a first end section 36 operatively connected to drain section 38 of sink 20 and a second end section 40 operatively connected to drainage line 24. Water or other fluid, particles, materials, and items that drain from sink 20 will (in the absence of any clog) flow through drain section 38 into drainage line 34 and then flow through drainage line 34 and into drainage line 24. Similarly, water or other fluid, particles, materials, and items that drain from sink 22 will (in the absence of any clog) flow through drain section 28 into drainage line 24. The water or other fluid, particles, materials, and items within drainage line 24 will flow (in the absence of any clog) downwardly, and by gravitation, through drainage line 24 and into cleanout port drain assembly 10 at central inlet section 12.

As shown in FIG. 1, outlet line 42 may include first end section 44 that operatively connects to upper end section 46 of outlet section 14 of cleanout port drain assembly 10. Although not shown, second end section 48 of outlet line 42 may be operatively connected to drain conduit or piping positioned behind the wall of the structure. The drain conduit or piping may vent to the atmosphere through a vent pipe, which through proper ventilation allows for the water or other fluid, particles, materials, and items draining from sinks 20, 22 to flow to a main line, a lifting station(s), and to a sewage treatment system or facility for processing. The sewage treatment system may be a processing plant that is miles away from the structure (house, apartment complex, office building, or other dwelling) where cleanout port drain assembly 10 is installed.

Again with reference to FIG. 1, cleanout port section 16 may include upper end section 50. End cap 52 may be detachably affixed to upper end section 50. End cap 52 closes off access to cleanout port section 16 when affixed to upper end section 50. End cap 52 may include an inner water leak prevention gasket that provides a sealing connection with upper section 50 of cleanout port section 16 when end cap 52 is secured onto upper section 50.

Water or other fluid, particles, materials or items draining down through drainage line 24 will flow into central inlet section 12 and will flow from central inlet section 12 to outlet section 14 and from outlet section 14 into outlet line 42 where the water or other fluid, particles, materials, or items will flow through the drain conduit or piping out of the structure to the main line, lifting station(s), and to the sewage treatment system. The configuration of cleanout port drain assembly 10 as a P-trap results in an amount of water (i.e., a trap seal) being retained within cleanout port assembly 10 at a level whereby sewer gases are prevented from flowing upward through cleanout port drain assembly 10 (either through drainage line 24 and to out through drains 28, 38 or through cleanout port section 16 when end cap 52 has been removed) and into the atmosphere within the structure. The trap seal or retained water within cleanout port drain assembly 10 may have an upper surface level extending from the level of trap dip 54 to the level where upper section 46 of outlet section 14 connects with first end section 44 of outlet line 42. The upper surface level of the trap seal or retained water within cleanout port drain assembly 10 will not fall below the level of trap dip 54.

Figure 2:
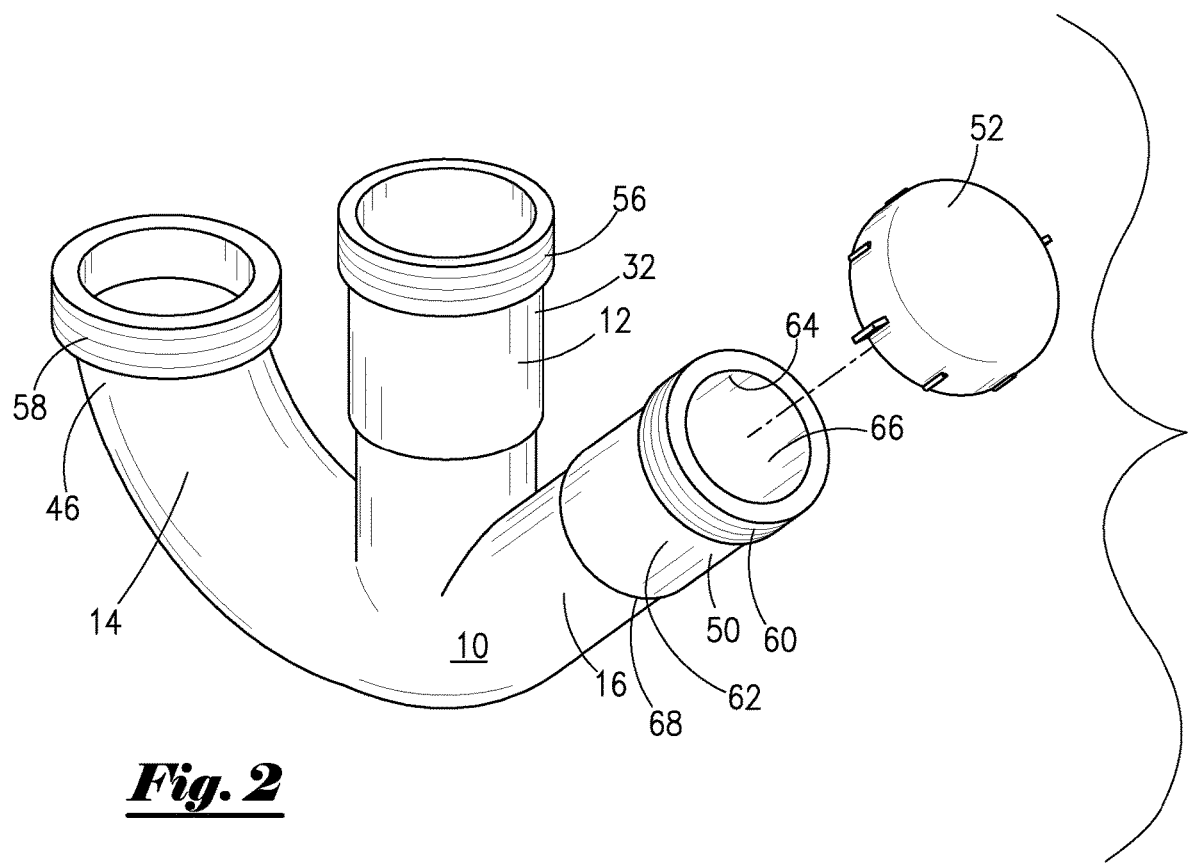
FIG. 2 is an exploded view of the first embodiment of the cleanout port drain assembly.
Figure 3:
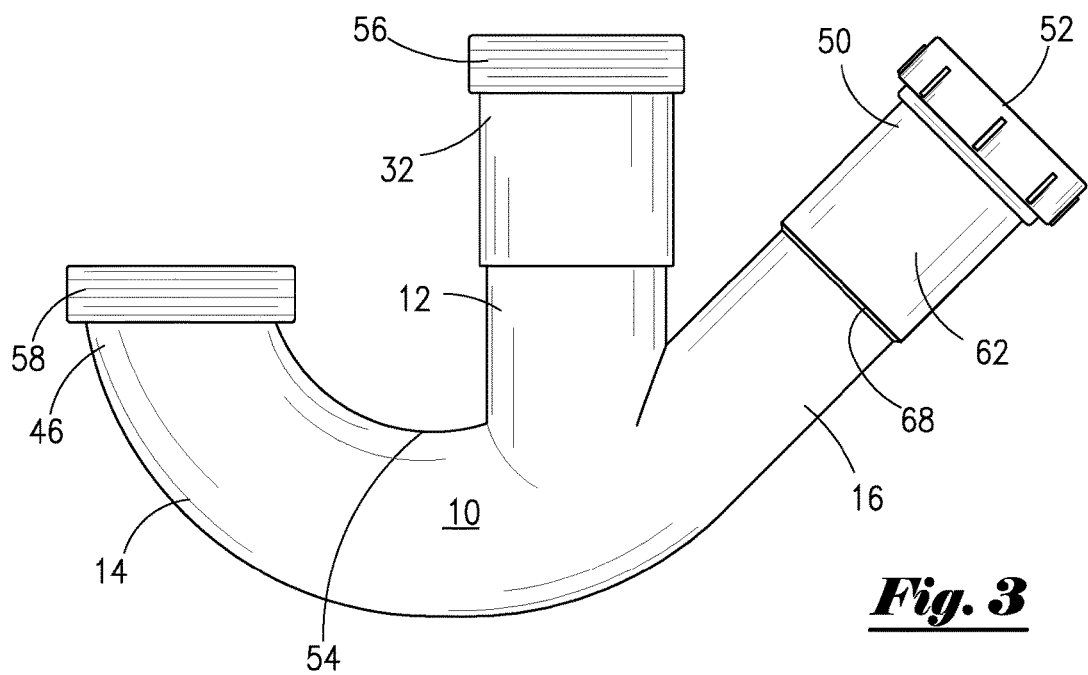
FIG. 3 is a side view of the first embodiment of the cleanout port drain assembly.

With reference to FIGS. 2 and 3, upper end section 32 of central inlet section 12 may contain threads 56 that mate with cooperating threads on first end section 26 of drainage line 24 such that upper end section 32 of central inlet section 12 threadedly connects with first end section 26 of drainage line 24. Upper end section 46 of outlet section 14 may contain threads 58 that mate with cooperating threads on first end section 44 of outlet line 42 such that upper end section 46 of outlet section 14 threadedly connects with first end section 44 of outlet line 42. Upper end section 50 of cleanout port section 16 may contain threads 60 that mate with cooperating threads on an inner wall section of end cap 52 such that end cap 52 threadedly connects to upper end section 50 of cleanout port section 16. It is to be understood that means other than threaded connection may be provide on either upper end section 50 of cleanout port section 16 and/or on end cap 52 in order to achieve selective detachable connection of end cap 52 to upper end section 50. For example, end cap 52 could be snap fitted onto upper end section 50. As another example, end cap 52 could be clamped onto upper end section 50. As another example, end cap 52 could be provided with extended threads that mate with cooperating threads on the inner wall 64 of upper end section 50 of cleanout port section 16.

As seen in FIG. 2, upper end section 50 of cleanout port section 16 may include nozzle receiving section 62. Nozzle receiving section 62 may contain an enlarged internal diameter to accommodate, in airtight arrangement, the outer surface of the nozzle of the suction device when the nozzle is inserted into nozzle receiving section 62. Accordingly, the enlarged internal diameter of nozzle receiving section 62 may be dimensioned to receive the outer surface of the nozzle and to provide an air tight seal between the outer surface of the nozzle and inner wall 64 of nozzle receiving section 62. Nozzle receiving section 62 may start at opening 66 and terminate at point 68. Inner wall 64 may be configured with a taper to provide an airtight fit for the nozzle of a suction device, particularly when the outer surface of the nozzle is tapered. The degree of taper of inner wall 64 may match or be substantially equal to the degree of taper of the outer surface of the nozzle. The taper in inner wall 64 may extend from opening 66 and terminate at point 68. The taper may cause the inner diameter of inner wall 64 to gradually decrease from opening 66 to point 68.

Figure 4:
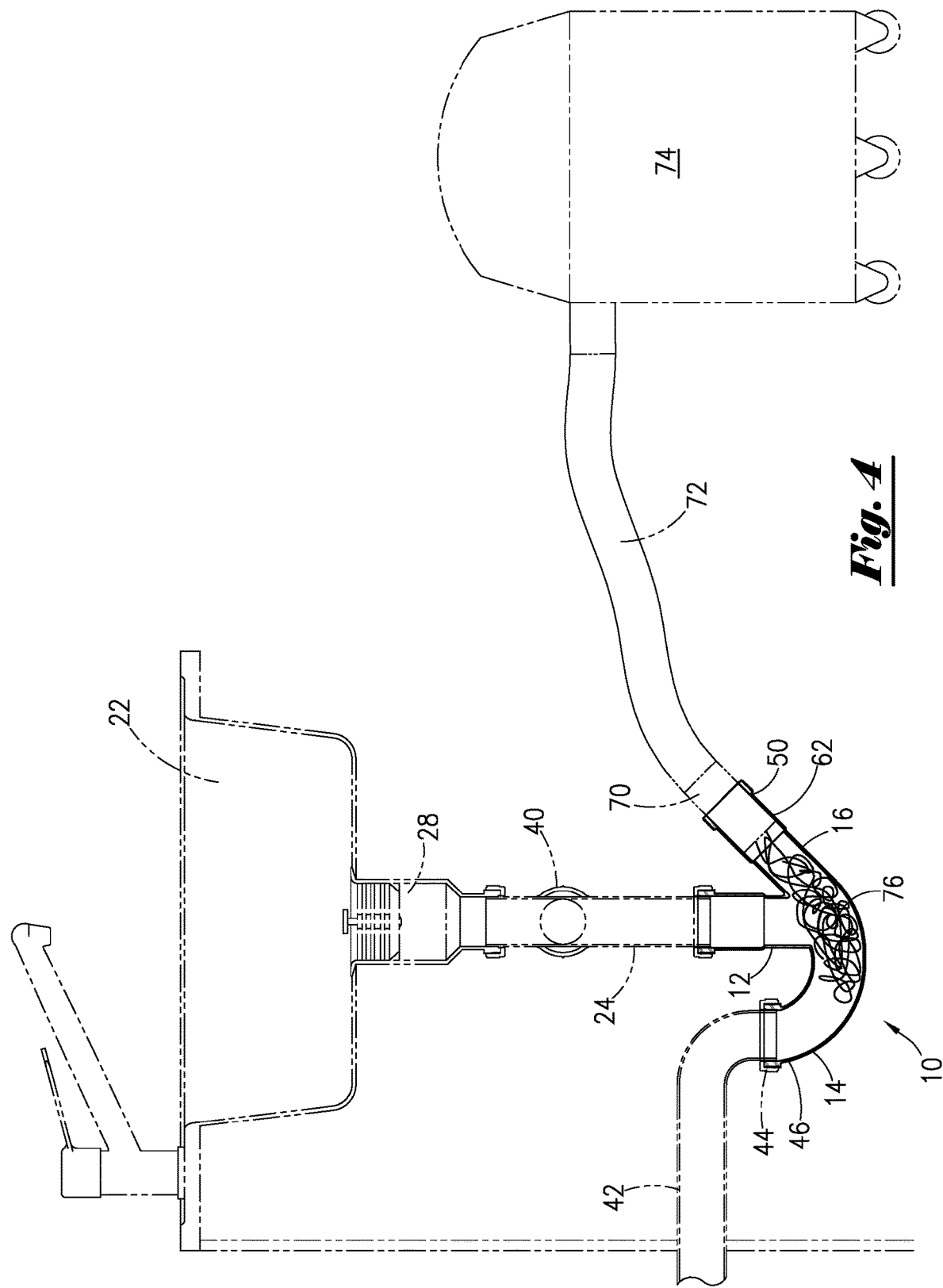
FIG. 4 is a cross-sectional view of the first embodiment of the cleanout port drain assembly associated with a drain trap with a suction device operatively in place within the cleanout port section and depicting the suction removal of a clog.

As seen in FIG. 4, end cap 52 has been removed from upper end section 50 of cleanout port section 16. Nozzle 70 is inserted into nozzle receiving section 62 in an air tight configuration. Nozzle 70 is connected to hose 72. Hose 72 is operatively connected to suction device 74. Suction device 74 may be any type of equipment capable of creating a suction force. For example, suction device 74 may a shop vac, wet vac, or suction tank. After insertion of nozzle 70 into nozzle receiving section 62 of cleanout port section 16, suction device 74 may be actuated to create a suction force within hose 72. Because of the airtight fit of nozzle 70 within nozzle receiving section 62, a suction force is created within cleanout port drain assembly 10 and within the drain lines or piping fluidly connected to cleanout port drain assembly 10, as for example, drainage line 24 or outlet line 42. Clog 76 (which may be formed of waste material such as grease, food particles, hair, etc.) is subjected to the suction force and will dislodge from the area where clog 76 was positioned and blocking drainage system 18 (e.g., in outlet line 42, drainage line 24, central inlet section 12, or outlet section 14) from draining. The suction force created by suction device 74 will cause clog 76 to be pulled from its clogging position towards and into nozzle 70, and from there pulled through hose 72 and into a waste storage container or bag within or operatively associated with suction device 74.

Figure 5:
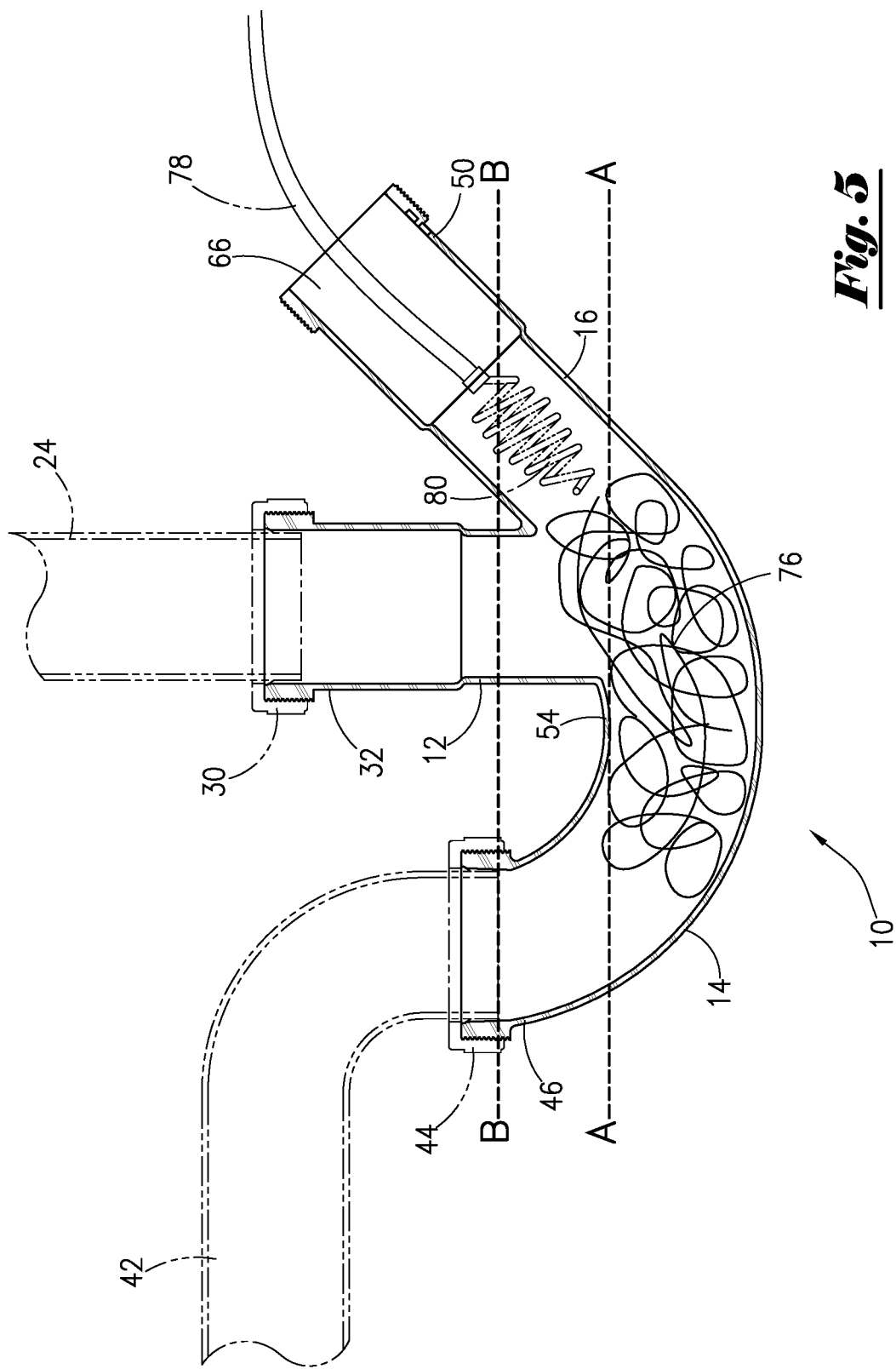
FIG. 5 is a cross-sectional view of the first embodiment of the cleanout port drain assembly with the end of a snake inserted into the cleanout port section.

FIG. 5 shows an alternative method of removing clog 76 in order to permit drainage system 18 to drain. Rather than use suction device 74, or in tandem with the use of suction device 74, snake 78 may be run through opening 66 in upper end section 50 of cleanout port section 16 and into cleanout port drain assembly 10 and/or through cleanout port drain assembly 10 to outlet line 42 (and through additional drain piping or conduit to the location of clog 76) where head 80 of snake 78, as it rotates, binds into clog 76. Retrieval of snake 78 from the drain piping or conduit and out through cleanout port drain assembly 10 (with clog 76 bound to head 80) clears clog 76 so that drainage system 18 may drain.

As mentioned above, when drainage system 18 has properly drained, a trap seal or retained water will remain in cleanout port drain assembly 10 to prevent sewage gases from escaping into the structure through drainage system 18.

The upper surface of the trap seal will be at a level no lower than line A-A running through trap dip 54 and no higher than line B-B as shown in FIG. 5. Even at the higher retained water level of line B-B, removal of end cap 52 will not result in the retained water exiting opening 66 in cleanout port section 16.

Figure 6:
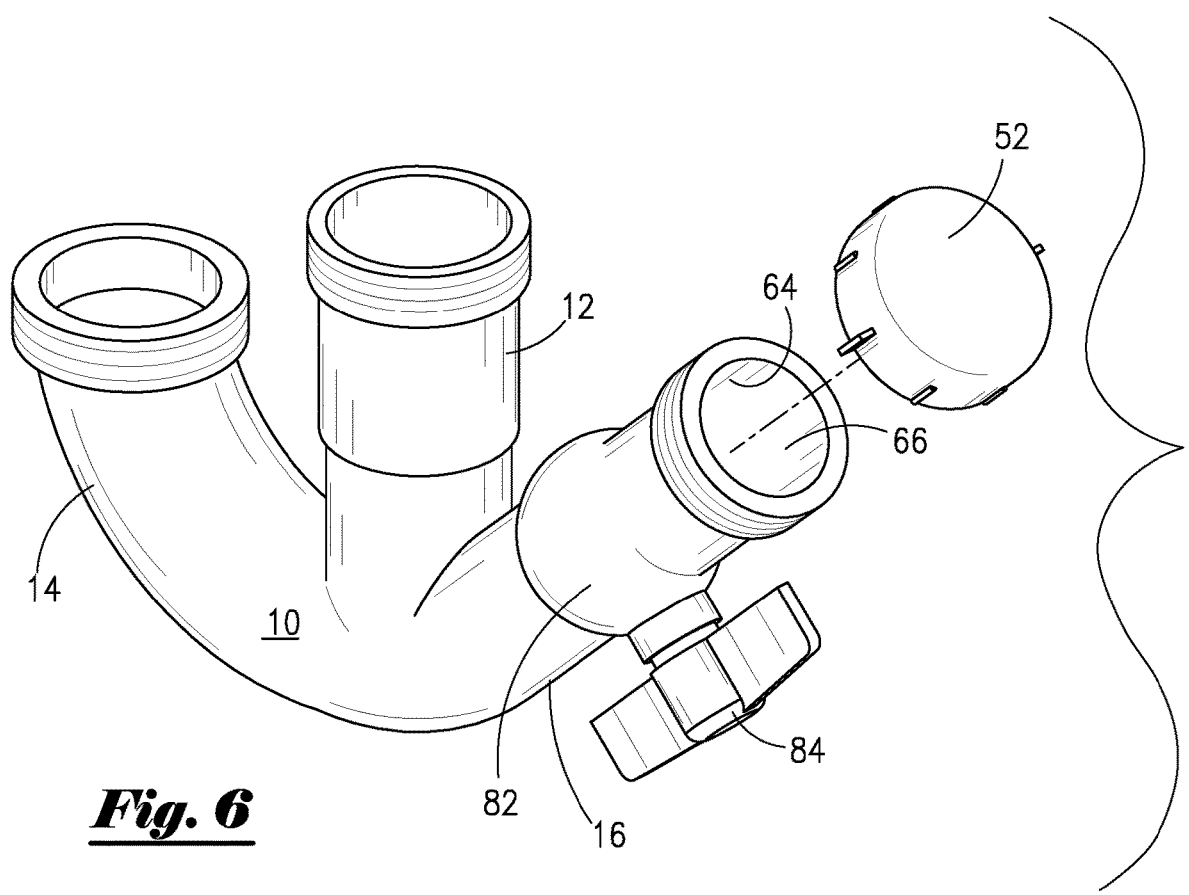
FIG. 6 is an exploded view of a second embodiment of the cleanout port drain assembly.
Figure 7:
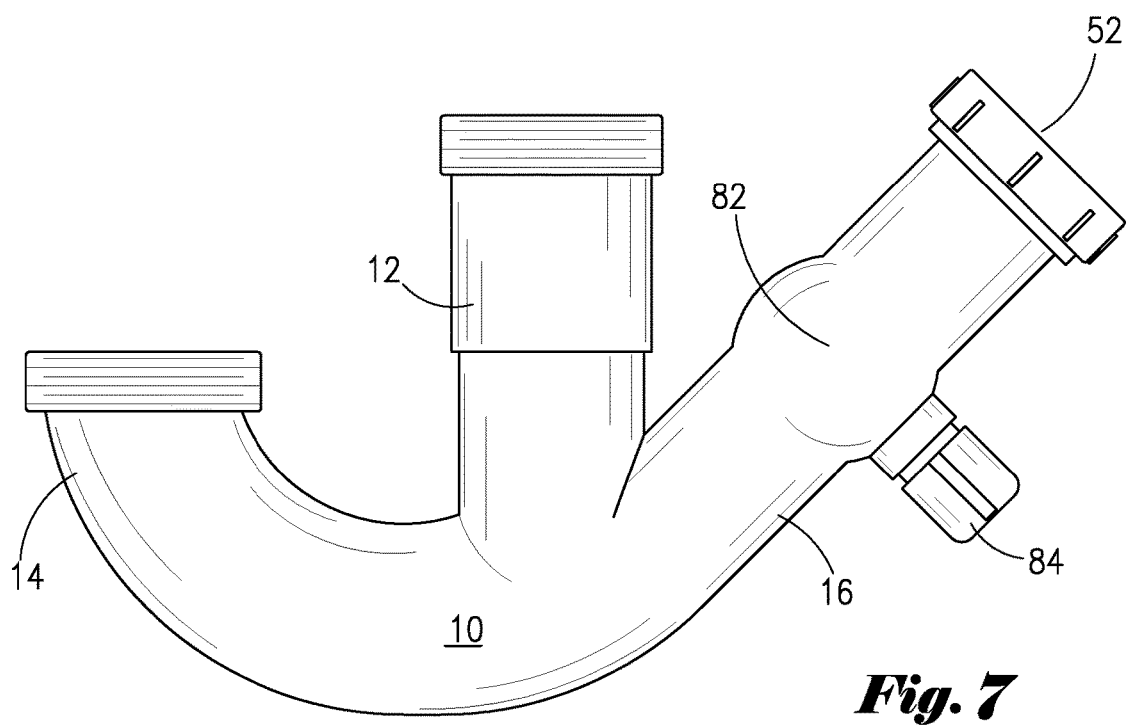
FIG. 7 is a side view of the second embodiment of the cleanout port drain assembly.

Another embodiment of cleanout port drain assembly 10 is depicted in FIGS. 6 and 7. In this embodiment, valve 82 is operatively associated with cleanout port section 16. Valve 82 may be positioned within inner wall 64 to selectively control the flow of fluid within cleanout port section 16. For example, valve 82 may be actuated to a closed position such that the flow of fluid within cleanout port section 16 is restricted and prevented from flowing out through opening 66 when end cap 52 is removed. Valve 82 may also be actuated to an open position such that fluid or other materials (e.g., clog 76) may pass through opening 66 and be removed, as for example, by suctioning with suction device 74 or by extraction with snake 78. Valve 82 may be any type of valve capable of selectively preventing the flow of fluid or other materials through opening 66 of cleanout port section 16 and selectively permitting the flow or passage of fluid or other materials (e.g., clog 76) through opening 66 of cleanout port section 16. Valve 82 may be a ball valve, flapper valve, butterfly valve, or similar valve. Valve 82 may include external actuating means 84 for manual actuation of valve 82.

Figure 8:
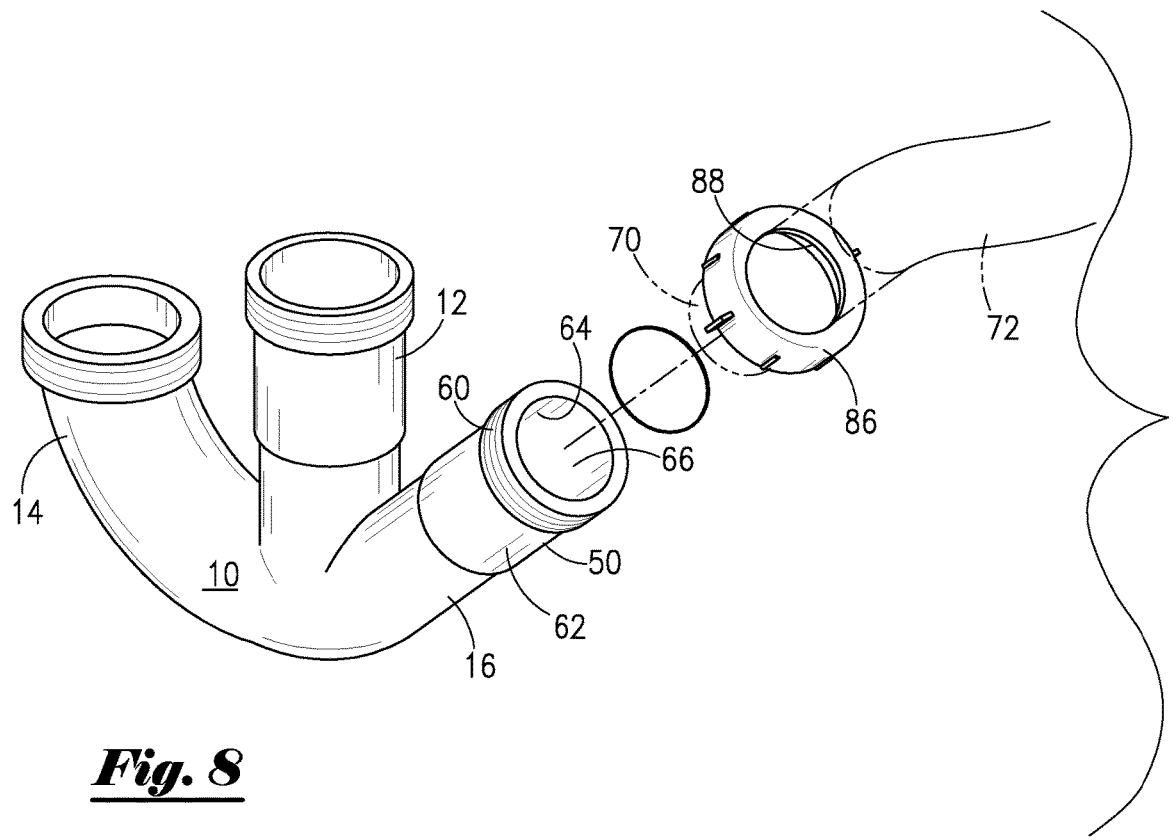
FIG. 8 is a partial exploded view of the first embodiment of the cleanout port drain assembly with the end of the suction device having a connecting collar that connects the end of the suction device to the cleanout port section.
Figure 9:
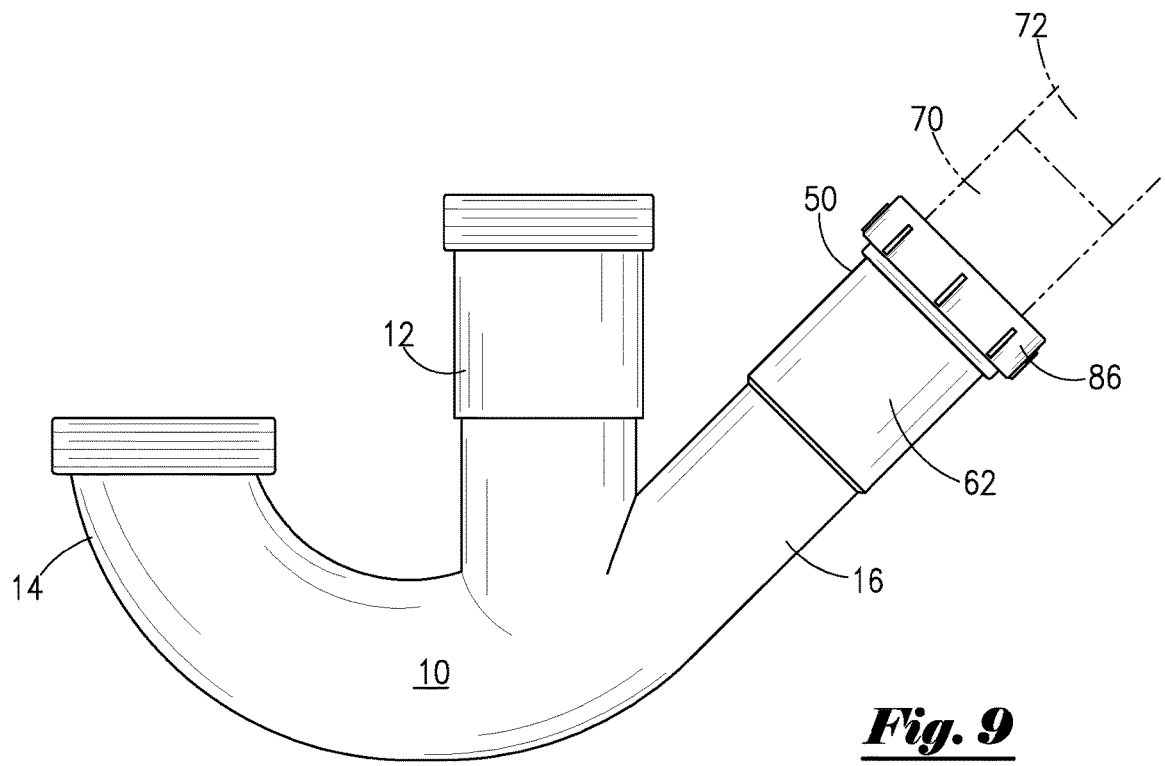
FIG. 9 is a side view of the first embodiment of the cleanout port drain assembly shown in FIG. 8 with the connecting collar connecting the end of the suction device to the cleanout port section.

FIGS. 8 and 9 illustrate an alternative arrangement for securing nozzle 70 within nozzle receiving section 62 of cleanout portion section 16 so that an airtight connection is achieved. Nozzle 70 is provided with connection collar 86. Connection collar 86 includes internal threads 88 that mate with cooperating external threads 60 on upper end section 50 of cleanout port section 16. Nozzle 70 is inserted through opening 66 and within inner wall 64 of nozzle receiving section 62. Connection collar 86 is placed on upper end section 50 at opening 66 and rotated to threadedly engage internal threads 88 of connection collar 86 to external threads 60 of upper end section 50 to form an air tight sealing connection between nozzle 70 of suction device 74 and cleanout port drain assembly 10 such that the application of a suctioning force generated by suctioning device 74 will cause the displacement and removal of clog 76 from the drain piping so that drainage system 18 may drain.

To remove clog 76 using cleanout port drain assembly 10, a person opens the door or other housing containing drainage system 18 to which cleanout port drain assembly 10 is operatively connected. Because cleanout port section 16 is front facing, access to opening 66 is easy accessible. End cap 52 is removed. Depending on the application used, either nozzle 70 of suction device 74 is inserted through opening 66 and into inner wall 64 of upper end section 50 (or nozzle receiving section 62) or snake 78 is run through opening 66 to the location where clog 76 is located in the drain piping.

In the application using suction device 74, the person activates suction device 74 to produce a suction force. The suction force acts upon clog 76 to dislodge clog 76 and suction (pull) clog 76 from the drain piping, through nozzle 70 and hose 72, where clog 76 is deposited in a storage container or bag either within or operatively connected to suction device 74. End cap 52 is reconnected to upper end section 50 to close off opening 66. Clog 76 may later be transported in the container or bag to an offsite waste facility.

In the application using snake 78, head 80 is pushed through the drain piping to the location of clog 76. Rotation of head 80 causes head 80 to entrap or bind with clog 76. Snake 78 (with clog 76 affixed to head 80) is pulled from the drain piping and exits from opening 66 in cleanout port drain assembly 10. Clog 76 is then removed from head 80 and placed in a container for offsite transport. End cap 52 is reconnected to upper end section 50 to close off opening 66.

Conventional P-traps do not include a front facing cleanout port. They either have no cleanout port or a bottom cleanout port positioned on the underside of the J-bend. P-traps with bottom cleanout ports are disadvantaged because they often result in clogs forming at the location of the port. Furthermore, access to the port is difficult because of its location on the underside of the J-bend. Also, when access to the port is gained, the trap seal or retained water in the P-trap will flow out of the port and requires capture in a bucket or similar container placed underneath the P-trap. In the absence of a bucket or container, the water will flow out of the P-trap and onto the floor underneath the P-trap thereby requiring clean up.

With conventional P-traps without a cleanout port (and even with those with a bottom cleanout port), the removal of a clog involves moving or pushing the clog in the direction away from the drain and towards the main line so that once dislodged, the clog will travel to the main line and eventually arrive at the sewage treatment facility that may be several miles away from the drain. For example, a person may pour caustic chemicals down the drain that dissolve the clog to the point where it dislodges from the drain piping and then travels to the main line and to the treatment facility. Alone, or in conjunction with the use of caustic chemicals, a person may use a plunger at the drain opening in an effort to move the clog. The addition of caustic chemicals to the sewage system is detrimental to the environment. The use of caustic chemicals may also cause the degradation and/or destruction of the drain pipes. Furthermore, causing clogs to dislodge and travel to the sewage treatment facility serves to exponentially add more pollutants to the collective waste water that requires treatment at the sewage treatment facility.

Clearing clogs from drain piping using a conventional P-trap (with or without a bottom cleanout port) often requires the disassembly and reassembly of the drain pipes, which may be a labor intensive, costly, and time consuming endeavor.

Cleanout port drain assembly 10 takes advantage of the fact that clogs 76 typically occur within a distance of 1" to 24" from drain sections 28, 38. Clog 76 closes off the air vent behind the wall of the structure; thus the drain piping is no longer an open end pipe. With clog 76 cutting off air from the vent, it becomes possible to establish and apply a suction force within the drain piping upstream from clog 76. The suction force causes the mechanical cleaning of the drain piping from the sink drain opening, through drainage line 24, cleanout port drain assembly 10, outlet line 42, and piping in fluid communication with to the main line under the slab drain. Rather than pushing clog 76 down to the main line and to the sewage treatment facility, the use of suction force pulls clog 76 out of the drain piping. Clog 76 is then captured in a container housed within or in fluid communication with suction device 74. The container may be, for example, a biodegradable bag, that together with the collected waste (e.g., clog 76), may be disposed at a landfill for absorption into the earth. No disassembly of the drain piping is necessary. Access to the drain piping is provided by the removal of end cap 52 from cleanout port section 16. Such access is easily accomplished for the insertion of nozzle 70 or snake 78 because of the front facing and angular placement of cleanout port section 16, which is readily accessible to a person standing, crouching, or sitting in front of the cleanout port drain assembly 10.

Cleanout port section 16 is positioned, angled, and sized to be used with standard sized suction devices 74, such as shop vac hoses and wands. Cleanout port drain assembly 10 is also configured to be drain cable friendly with no internal diameter edges or sharp curvatures to jam up, prevent, or make it difficult to extend the drain auger cable through cleanout port drain assembly 10.

Cleanout port drain assembly 10 may be made of a variety of materials. For example, assembly 10 may be made of metal, such as copper. Assembly 10 may be made of natural or synthetic plastic, such as polyvinyl chloride or PVC.

Cleanout port drain assembly 10 may be dimensioned in a variety of external and/or internal sizes and shapes depending on the dimension of the drain piping to which assembly 10 is connected to.

Cleanout port section 16 may be angled upwardly. The angle and/or length of cleanout port section 16 may vary so long as cleanout port section 16 is configured such the upper level of the trap seal or retained water in cleanout port drain assembly 10 is below opening 66, as for example, 0.5" to 3" below opening 66. For example, cleanout port section 16 may have a length of in the range of about 2.5" to about 6.0," or about 4.0", and an upward angle in the range of about 40 to about 60 degrees, or about 50 degrees. The outer diameter of cleanout port section 16 may range from about 1.26" to about 1.22", or about 1.24". The inner diameter of cleanout port section 16 may range from about 1.355" to about 1.215", or about 1.23". As mentioned above, inner wall 64 of nozzle receiving section 62 may contain a taper such that the inner diameter of cleanout port section 16 at nozzle receiving section 62 reduces from about 1.26" at opening 66 to about 1.22" at point 68. The taper of inner wall 64 may be identical to the taper of the outer surface of nozzle 70 so that nozzle 70 is stack fit within cleanout port section 16.

Cleanout port section 16 may be sized to fit all 1.5 to 5 gallon shop vac hoses and wands. For 8 to 15 gallon shop vac hoses and wands, nozzle 70 may be fit over the outer diameter of upper end section 50 of cleanout port section 16 in an air tight seal.

Cleanout port drain assembly 10 is also configured for self-cleaning; it will not gather food or other waste particles (as do conventional bottom cleanout ports). The upward angular positioning of cleanout port section 16 uses the gravitational weight of the draining or falling water from the drain through drainage line 24 to create a waterfall kickback or counterclockwise swirl when it meets the retained water in cleanout port drain assembly 10. The kickback or swirl produces a self-cleaning turbulence thus preventing a clog from forming within cleanout port drain assembly 10.

Cleanout port drain assembly 10 provides a faster and easier way to remove clog 76 using either section device 74 or snake 78 without any drain pipe disassembly because none of the existing connections affixing cleanout port drain assembly 10 to drainage line 24 and/or outlet line 42 are disturbed. Therefore, no leaks are created when using cleanout drain port assembly 10 as no components are disconnected.

The application of a hydromechanical and hydrodynamic "forced suction" on a fully and partially clogged pipe that has lost its ability to vent itself causes the forced suction pressure to build upon itself until the clog begins to break loose due to slugging, jumping, "self-pumping" due to the action of knocking, rocking, and water ramming of the drain piping to clean itself. Mechanical dynamics provides that clog 76 is pulled by the suction force to the source of the suction, i.e., suction device 74. The concept of a force suction upon clog 76 is counterintuitive to conventional drain unclogging operations. Furthermore, periodic use cleanout port drain assembly 10 via force suction by suction device 74 can act as a preventative means to prevent clog 76 from forming in the drain piping.

Cleanout port drain assembly 10 provides a sink drain line cleanout that is on the sink side of the J-bend, above the P-trap water level, and includes a large capped front facing opening or cleanout port in the direction of the drain lines, which is exactly where sink clogs tend to form. Cleanout port drain assembly 10 is shop vac and drain cable specific.

To remove a clog from the drain system that includes cleanout port drain assembly 10 vis-à-vis "forced suction," a user may remove any standing water and waste from the top side of any backed up non-draining sink or basin and then close off the drain openings with sink basket strainers, pop-up stoppers, or the like. This will mechanically cut off any topside ventilation. The user may then remove end cap 52 from upper section 50 of cleanout port section 16. The user may then insert nozzle 70 of suction device 74 into the upper section 50 of cleanout port section 16. The user may then activate suction device 74. Forced suction is created because the top side of the sink cannot vent due to the drain closure with sink basket strainers, pop-up stoppers, and the like. Likewise, the sealing connection between nozzle 70 and inner wall 64 of cleanout port section 16 prevents any venting. Clog 76, together with any sludge and water in the system, closes off any venting into the drain piping from the vent pipe. The forced suction dislodges and removes clog 76 from the drain piping so that drainage system 18 can function properly to drain. The forced suction will cause sludge, sidewall scale, water, clogs 76, and waste to break apart and work against itself. Through the creation, vis-à-vis the forced suction, of vibration, turbulence, and/or hammering in the drain piping, the clog and other particle matter dislodges and pulls backwards to the suction source, i.e., suction device 74, thereby providing a full inner wall pipe cleaning and restoration of proper drainage because the drain piping now contains clean "open end" pipes and ventilation.

While preferred embodiments of the present invention have been described, it is to be understood that the embodiments described are illustrative only and that the scope of the invention is to be defined solely by the appended claims when accorded a full range of equivalence, many variations and modifications naturally occurring to those skilled in the art from a perusal hereof.

What is claimed is:

1. A cleanout port drain assembly comprising:
    a central inlet section having an upper end section and a lower end section, the upper end section configured for connection to a drain line;
    a C-shaped outlet section having an upper end section and a lower end section, the upper end section of the C-shaped outlet section configured for connection to an outlet line, the lower end section of the C-shaped outlet section terminating at the lower end section of the central inlet section, the central inlet section and the C-shaped outlet section being in fluid communication with each other;
    a cleanout port section having an upper end section and a lower end section, the upper end section of the cleanout port section including a detachable end cap, the lower end section of the cleanout port section terminating at the lower end section of the central inlet section, the cleanout port section extending upwardly at an angle away from the central inlet section, the cleanout port section being in fluid communication with the central inlet section and the C-shaped outlet section, and the cleanout port section including a valve positioned within an internal bore defined by an inner wall, the internal bore extending from the upper end section of the cleanout port section to the lower end section of the cleanout port section.

2. The cleanout port drain assembly of claim 1, wherein the angle of the cleanout port section is in the range of 40° to 60°.

3. The cleanout port drain assembly of claim 2, wherein the angle of the cleanout port section is about 50°.

4. The cleanout port drain assembly of claim 1, wherein the end cap is threadedly connected to the upper end section of the cleanout port section.

5. The cleanout port drain assembly of claim 4, wherein the end cap contains internal threads and the upper end section of the cleanout port section contains external threads.

6. The cleanout port drain assembly of claim 1, wherein the inner wall at the upper end section of the cleanout port section is dimensioned to accommodate a nozzle of a suction device.

7. The cleanout port drain assembly of claim 6, wherein the inner wall at the upper end section of the cleanout port section contains a taper configured to accommodate the nozzle of the suction device.

8. The cleanout port drain assembly of claim 1, wherein the upper end section of the cleanout port section contains external threads configured for mating engagement with a connecting collar containing internal threads, the connecting collar being associated with a nozzle of a suction device for detachable connection of the nozzle to the upper end section of the cleanout port section.

9. The cleanout port drain assembly of claim 1, wherein the valve is a mechanical valve.

10. A cleanout port drain assembly comprising:
a central inlet section having an upper end section and a lower end section, the upper end section configured for connection to a drain line, the central inlet section having a front side and a back side;
a C-shaped outlet section having an upper end section and a lower end section, the upper end section of the C-shaped outlet section configured for connection to an outlet line, the lower end section of the C-shaped outlet section terminating at the lower end section of the central inlet section, the C-shaped outlet section being positioned on the back side of the central inlet section, the central inlet section and the C-shaped outlet section being in fluid communication with each other;
a cleanout port section having an upper end section and a lower end section, the upper end section of the cleanout port section including a detachable end cap, the lower end section of the cleanout port section terminating at the lower end section of the central inlet section, the cleanout port section being positioned on the front side of the central inlet section and extending upwardly at an angle away from the central inlet section, the cleanout port section being in fluid communication with the central inlet section and the C-shaped outlet section, the cleanout port section including a valve positioned within an internal bore defined by an inner wall, the internal bore extending from the upper end section of the cleanout portion section to the lower end section of the cleanout port section.

11. The cleanout port drain assembly of claim 10, wherein the angle of the cleanout port section is in the range of 40° to 60°.

12. The cleanout port drain assembly of claim 11, wherein the angle of the cleanout port section is about 50°.

13. The cleanout port drain assembly of claim 10, wherein the end cap is threadedly connected to the upper end section of the cleanout port section.

14. The cleanout port drain assembly of claim 13, wherein the end cap contains internal threads and the upper end section of the cleanout port section contains external threads.

15. The cleanout port drain assembly of claim 10, wherein the inner wall at the upper end section of the cleanout port section includes an inner wall is dimensioned to accommodate a nozzle of a suction device.

16. The cleanout port drain assembly of claim 15, wherein the inner wall at the upper end section of the cleanout port contains a taper configured to accommodate the nozzle of the suction device.

17. The cleanout port drain assembly of claim 10, wherein the upper end section of the cleanout port section contains external threads configured for mating engagement with a connecting collar containing internal threads, the connecting collar being associated with a nozzle of a suction device for detachable connection of the nozzle to the upper end section of the cleanout port section.

18. The cleanout port drain assembly of claim 10, wherein the valve is a mechanical valve.

19. A method of removing a clog from a drain pipe system, comprising the steps of:
a) gaining access to a cleanout port drain assembly comprising: a central inlet section having an upper end section and a lower end section, the upper end section operatively connected to a drain line; a C-shaped outlet section having an upper end section and a lower end section, the upper end section of the C-shaped outlet section operatively connected an outlet line, the lower end section of the C-shaped outlet section terminating at the lower end section of the central inlet section, the central inlet section and the C-shaped outlet section being in fluid communication with each other; a cleanout port section having an upper end section and a lower end section, the upper end section of the cleanout port section including a detachable end cap, the lower end section of the cleanout port section terminating at the lower end section of the central inlet section, the cleanout port section extending upwardly at an angle away from the central inlet section, the cleanout port section being in fluid communication with the central inlet section and the C-shaped outlet section, the cleanout port section including a valve positioned within an internal bore defined by an inner wall, the internal bore extending from the upper end section of the cleanout portion section to the lower end section of the cleanout port section, the valve being in a closed position;
b) removing the detachable end cap from the upper end section of the cleanout port section to expose an opening in the upper end section of the cleanout port section;
c) inserting a nozzle from a suction device through the opening and into the upper end section of the cleanout port section to establish an airtight, watertight seal between the nozzle and the cleanout port section;
d) activating the suction device and placing the valve in an open position to create a suction force whereby the suction force causes the clog to dislodge from the drain pipe system and to be pulled by the suction force into the cleanout port section, through the opening, and through the nozzle to a container operatively associated with the suction device for capture and disposal of the clog;

e) removing the nozzle from the upper end section of the cleanout port section;

f) placing the valve in the closed position; and g) securing the end cap to the upper end section of the cleanout port section.

20. The method of claim 19, wherein the suction device is a portable shop vac or wet vac.

21. The method of claim 19, wherein the nozzle includes a connecting collar and wherein in step (d) the connecting collar is operatively connected to the upper end section of the cleanout port section and in step (f) the connecting collar is operatively disconnected from the upper end section of the cleanout port section.

22. A method of removing a clog from a drain pipe system, comprising the steps of:

a) using a suction device to suction a standing water from a sink or basin;

b) placing a stopper in the drain opening of the sink or basin to prevent a topside ventilation;

c) gaining access to a cleanout port drain assembly comprising: a central inlet section having an upper end section and a lower end section, the upper end section operatively connected to a drain line; a C-shaped outlet section having an upper end section and a lower end section, the upper end section of the C-shaped outlet section operatively connected an outlet line, the lower end section of the C-shaped outlet section terminating at the lower end section of the central inlet section, the central inlet section and the C-shaped outlet section being in fluid communication with each other; a cleanout port section having an upper end section and a lower end section, the upper end section of the cleanout port section including a detachable end cap, the lower end section of the cleanout port section terminating at the lower end section of the central inlet section, the cleanout port section extending upwardly at an angle away from the central inlet section, the cleanout port section being in fluid communication with the central inlet section and the C-shaped outlet section, the cleanout port section including a valve positioned within an internal bore defined by an inner wall, the internal bore extending from the upper end section of the cleanout portion section to the lower end section of the cleanout port section, the valve being in a closed position;

d) removing the detachable end cap from the upper end section of the cleanout port section to expose an opening in the upper end section of the cleanout port section;

e) inserting a nozzle from a suction device through the opening and into the upper end section of the cleanout port section to establish an airtight, watertight seal between the nozzle and the cleanout port section;

f) activating the suction device and placing the valve in an open position to create a suction force whereby the suction force causes the clog to dislodge from the drain pipe system and to be pulled by the suction force into the cleanout port section, through the opening, and through the nozzle to a container operatively associated with the suction device for capture and disposal of the clog;

g) removing the nozzle from the upper end section of the cleanout port section;

h) placing the valve in the closed position;

i) securing the end cap to the upper end section of the cleanout port section; and j) removing the stopper from the drain opening in the sink or basin.

23. The method of claim 22, wherein the nozzle includes a connecting collar and wherein in step (f) the connecting collar is operatively connected to the upper end section of the cleanout port section and in step (h) the connecting collar is operatively disconnected from the upper end section of the cleanout port section.

* * * * *